United States Patent [19]

Douziech et al.

[11] Patent Number: 4,837,625
[45] Date of Patent: Jun. 6, 1989

[54] AUTOMATIC GAIN CONTROL DEVICE FOR VIDEO SIGNALS

[75] Inventors: Patrick Douziech; Philippe Berger, both of Villingen, Fed. Rep. of Germany

[73] Assignee: SGS-Thomson Microelectronics S.A., Paris, France

[21] Appl. No.: 155,540

[22] Filed: Feb. 12, 1988

[30] Foreign Application Priority Data

Feb. 20, 1987 [FR] France .................. 87 02206

[51] Int. Cl.$^4$ .............................................. H04N 5/52
[52] U.S. Cl. .................................................. 358/174
[58] Field of Search ............... 358/174, 160, 166, 170, 358/171; 455/234, 240

[56] References Cited

U.S. PATENT DOCUMENTS 4,472,707 9/1984 Wilensky ............................ 358/174
4,745,411 5/1988 Barnhart ............................. 358/174

FOREIGN PATENT DOCUMENTS 0067585 12/1982 European Pat. Off. .
0104817 4/1984 European Pat. Off. .
111587 7/1983 Japan .
53384 3/1985 Japan .
2054993 2/1981 United Kingdom .

OTHER PUBLICATIONS

Rehfeldt, "A Multistandard Chip Set for VHS VCRS", *IEEE Transactions on Consumer Electronics*, vol. CE-30, No. 3, (Aug., 1984), pp. 382-389.
Catto, "Video AGC Reacts at TV Field Rate", *Electronic Engineering*, vol. 56, No. 686, (Feb., 1984):32.

*Primary Examiner*—Tommy P. Chin
*Attorney, Agent, or Firm*—Lowe, Price, LeBlanc, Becker & Shur

[57] ABSTRACT

An automatic gain control device for video signals in the form of an integrated circuit uses a loop comprising comparators (3, 4) for comparing the video signal to various thresholds. Up-down counters and driving circuit (5) up-down the comparison output signals, so that, in connection with the comparators output signals, different time constants are obtained to control the gain of an input circuit.

7 Claims, 1 Drawing Sheet

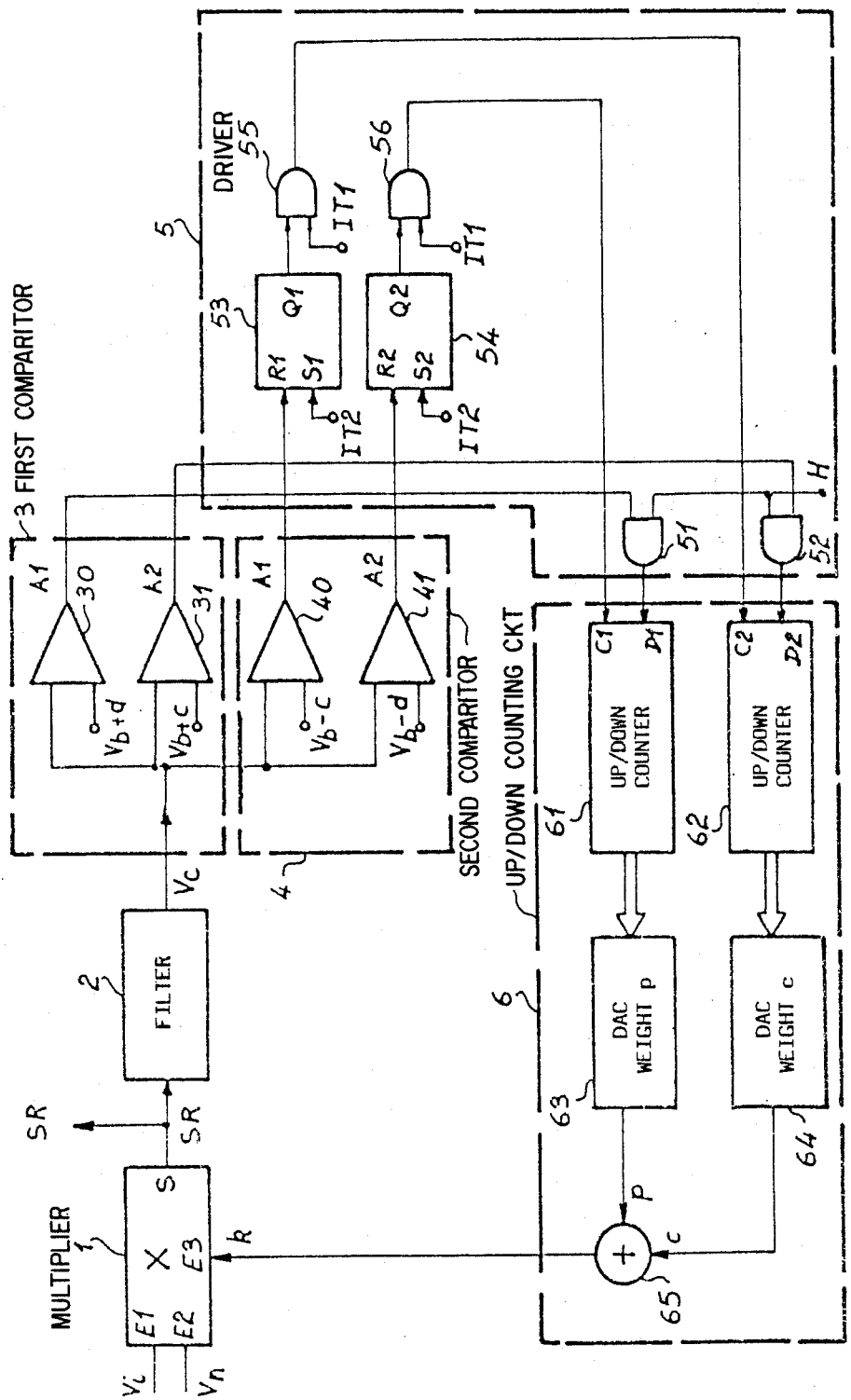

AUTOMATIC GAIN CONTROL DEVICE FOR VIDEO SIGNALS

TECHNICAL FIELD

The invention relates to automatic gain control (AGC) devices for video signals implemented in an integrated circuit.

BACKGROUND ART

An output video signal from various video signal sources, such as a TV receiver or a microprocessor or a video disk, presents variations on its peak to peak value. Therefore, the peripheral device using this video signal, for example a tape recorder for the TV receiver, has to comprise an AGC device for reducing this amplitude variation.

Conventional AGC devices are analog loop systems which compare a peak or quasi-peak value of the signal to a reference value. Such devices are chosen so that the gain modification time constant is sufficiently long, for example a plurality of lines of the video signal so that the video signal is not impaired during the gain modification. For this purpose, large capacitors are generally used and are not integrable. It is therefore necessary to add a capacitor externally to the integrated circuit and to provide for an additional connection pin in this purpose. However, when the image content is rapidly changing, distortion and overoscillation may occur. Therefore, very often, for improving the image quality, the time constant has to be shorter in case of gain reduction than in case of gain increase, and the circuit external to the integrated circuit has to be more complex.

A need therefore exists for an AGC circuit for video signals which avoids signal distortion and circuit overoscillation when the image content of the signal rapidly changes.

A need further exists for an AGC circuit for video signals which does not require an external capacitor.

Accordingly, an object of the invention is to provide an AGC circuit for video signals which has a time constant responsive to circuit gain variations.

Another object of the invention is to eliminate the need for an external capacitor.

DISCLOSURE OF THE INVENTION

The invention relates to an AGC device for video signals which does not comprise a capacitor external to the integrated circuit for obtaining the wished time constants. A first advantage of the invention is to free a connection pin of the integrated circuit.

The device according to the invention presents a different time constant according to the fact the gain is decreasing or increasing. The reductions of the gain are processed with a short time constant depending upon a clock signal present in the circuit and the increases of the gain are processed at the frame frequency during the frame return trace. Thus, the overoscillations of the loop and the image distortions are cancelled.

Accordingly, the invention provides for an automatic gain control circuit for video signals comprising :

a multiplier comprising two differential inputs, a first input receiving the video signal, a second input receiving the signal corresponding to the black level, and a third input for the gain setting ;

first comparison means receiving the video signal, first and second thresholds obtained from the signal providing the desired white level increased with first and second levels ;

second comparison means receiving the video signal, third and fourth thresholds obtained from the signal providing the desired white level decreased by the first and second levels ;

driving means receiving the output signals from the first and second comparison means, a frame return signal and a signal having a frequency higher than the frame return signal and providing pulse signals ;

counting means receiving the pulse signals, said signals being able to cause a count of a quantity proportional to the first or second level according to the comparison results and when the video signal is lower than the two thresholds, and to cause a count-down of a quantity proportional to the second or first level according to the comparison results and when the video signal is higher than the two thresholds ; the output signal of the counting means being received on the gain setting input of the multiplier for causing, according to the applied value, either a gain increase during frame return traces, or a decrease at an higher frequency.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING

The FIG. is a block diagram of the automatic gain control circuit with a digital gain control loop.

BEST MODE FOR CARRYING OUT THE INVENTION

The invention will be better understood in view of the following description made in connection with the attached drawing that shows an embodiment of the AGC device according to the invention.

The gain setting device permits to normalize the video signals from various sources such as tuner, camera, video tape recorder, microprocessor. The device according to the invention implements a fully different design with respect to the prior art circuits because the gain regulation loop carries out a digital processing of the signals whereby the conventional advantages of this type of processing are obtained but mainly the following problems are solved : integration, cancellation of the parasitic effects of the gain modification when the modification consists in increasing the gain, and also overoscillations due to rapid changes of the image.

A multiplier 1 receives on two differential inputs E1, E2 the video signal $V_i$ and the signal $V_n$ corresponding to the black level and, on a third input E3, the multiplication factor for setting the gain. The output signal SR at the output S of multiplier 1 is applied to the input of an RC filter 2 which filters and smoothes the video signal, this filter having a determined cut-off frequency in the range of 500 KHz. This filter is implementable by means of an integrated capacity lower than 10 pF. The output signal from the filter is applied to the input of a comparator set. This set comprises a first group 3 of two comparators 30 and 31 and a second group 4 of two comparators 40 and 41.

The first comparator group compares the video signal $V_c$ with two predetermined thresholds above which one wishes to set the gain, the one being lower than the other and permitting an accurate setting of the gain. The highest threshold corresponds to the level $V_b$ of the desired maximum white level to which is added a level d which is preferentially equal to 1.1 dB of the desired value $V_b$. The lowest threshold corresponds to the white level $V_b$ to which is added a level c (c being lower than d) which is preferentially equal to 0.1 dB of the desired value $V_b$.

The second comparator group compares the video signal $V_c$ with two other thresholds below which a gain setting is desired, the one threshold being lower than the other to permit accurate setting of the gain. The highest threshold corresponds to the desired white level $V_b$ from which is substracted the level c which is preferentially equal to 0.1 dB of the desired $V_b$ value. The lowest threshold corresponds to the white level $V_b$ from which is substracted the level d which is preferentially equal to 1.1 dB of the desired value $V_b$.

A driving circuit 5 receives signals from the output signals of the comparators 30, 31, 40, to drive an up-down counting circuit 6. The output of comparator 30 drives the down-counting input of an up-down counter 61 of circuit 6 through an AND gate 51 of circuit 5, the output of comparator 31 drives the down-counting input of an up-down counter 62 of circuit 6 through an AND gate 52 of circuit 5. Gates 51 and 52 receive on their second input a signal H, the frequency of which is higher than the frame frequency.

The output of comparator 40 drives the input R of an RS flip-flop 52 of circuit 5. The output of comparator 41 drives the input R2 of an RS flip-flop 54 of circuit 5. The inputs S1 and S2 of those two flip-flops receive a signal IT2 at the frame frequency, synchronized with the end of the frame-return signal (negative edge of the frame-return pulse). The output Q1 of flip-flop 53 is applied to an input of an AND gate 55, the output of which drives the up-counting input C2 of the up-down counter 62. The output of gate 56 drives the up-counting input C1 of the up-down counter 61. The data resulting from the up or down counting at the output of each counter are n-bits words, n being equal to 4. The four-bit word (nibble) corresponding to the highest weight p is applied to the input of a digital/analog converter (DAC) 63. The nibble corresponding to the lowest weight q is applied to the input of a DAC 64. The outputs of DACs 63 and 64 are applied to the inputs of an adder 65 which provides a gain setting signal to the multiplier 1.

The operation of the device is as follows:

The multiplier 1 applies a multiplying factor k to the voltage $V_i-V_n$ received on its differential inputs E1, E2 and provides a voltage $k(V_i-V_n)$ at its output S. The factor k is given by the counting circuit 6 and varies in correspondence with the results of the comparison circuits 3 and 4. When the signal $V_c$ at the output of the integrating filter 2 is lower than $V_b-1.1$ dB, the outputs A1, A2 of comparators 40, 41, are, in this case, for example, equal to 0. Otherwise, an inverter should be arranged at the inputs R1 and R2 of the flip-flops. The inputs R1 and R2 of flip-flops 53 and 54 are at a zero level. The inputs C1 and C2 of counters 61 and 62 count one stroke as soon as a pulse IT1 is present, that is at the beginning of the frame return trace. The DACs 63 and 64 increase of one bit each, the gain increases by p+c, that is 1.1 dB (p=1 dB, c=0.1 dB) and the gain remains constant during the following frame.

When signal $V_c$ is comprised between $V_b-1.1$ dB and $V_b-0.1$ dB, the output A1 of comparator 40 is zero, and the output A2 of comparator 41 is 1. The flip-flop 53 keeps the same state while the state of flip-flop 54 changes, Q1 is equal to 1, Q2 is equal to 0, the counter 62 counts once while the counter 61 no longer counts, the converter 64 increases of 1 bit, and the gain is increased of 0.1 dB.

When signal $V_c$ is comprised between $V_b-0.1$ dB and $V_b+0.1$ dB, the output of comparator 40 passes to 1, the output Q1 passes to zero, the counters 61 and 62 do not count, the gain is unchanged, that is the amplitude of the video signal is in a satisfactory value range.

When signal $V_c$ is comprised between $V_b+0.1$ dB and $V_b+1.1$ dB, the output A2 of comparator 31 is at 1, the output of comparator 30 is at 0. Gate 52 provides a 1 at its output as soon as a clock pulse H appears, the counter 62 counts down up to obtaining a gain permitting to the amplitude of the singal to be comprised between $V_b-0.1$ dB and $V_b+0.1$ dB.

When signal $V_c$ is higher or equal to $V_b+1.1$ dB, the output of comparator 30 is at 1, the output of comparator 31 is also at 1, the counters 61 and 62 count down at each pulse of clock H. The gain H decreases until obtaining a level comprised between $V_b+0.1$ dB and $V_b-0.1$ dB.

The case of an undefinite output Q given by the inputs R and S at 1 cannot occur because the signal IT2 is at 1 at the end of the frame return trace, and at this instant there is no luminance signal.

The choice of two 4-bit counters rather than one 8-bit counter permits a decrease in the size of the circuit as it is then possible to associate to each 4-bit counter a 4-bit DAC, an 8-bit DAC being much more cumbersome than two 4-bit DACs.

The choice of thresholds equal to 1.1 dB and 0.1 dB provides the best operational conditions, that is for avoiding any loop oscillation. Of course, any other value close to those values should be appropriate.

The device according to the invention implements a digital gain setting loop for a video signal by applying this signal to the differential input of a multiplier, the multiplying factor which is used for setting the gain being obtained by an up-down counter. This structure increases circuit gain by incrementing the counters or decreases gain by decrementing the counters as a function of the comparison results between said video signal and an acceptable level close to the desired maximum white level value. Converters having various weights are chosen without increasing the number of bits of the counters and of the converters. Those weights are accordingly chosen so that the maximum content of the low weight counter (16×0.1 dB) has an higher value than the minimum weight (1 dB) of the high weight counter. According to this particular example, a weight p of 1 dB has been chosen for the converter 63 and a weight c of 0.1 dB for the converter 64. The gain decreases are synchronized with clock H which is a fast clock comprised for example between 50 and 500 KHz. The gain increases are synchronized with the frame return trace signal, which occurs during the frame return trace, this avoiding any risk of having spurious signals on the image The time constant for obtaining a maximum increase of the gain is equal to 8 frames, that is 160 ms.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. An automatic gain control device for video signals comprising:

a multiplier (1) comprising first and second differential inputs (E1, E2), said first differential input (E1) receiving an input video signal ($V_i$), said second differential input (E2) receiving a black level signal ($V_n$) corresponding to a video black level, said multiplier further comprising a third input (E3) for receiving a gain setting signal and an output for supplying a video signal;

first comparison means (3) receiving the video signal ($V_c$) from the output of said multiplier and first and second thresholds which are obtained from a signal providing a desired white level ($V_b$) increased respectively with first (d) and second (c) levels and outputting respective difference signals;

second comparison means (4) receiving the video signal ($V_c$) from the output of said multiplier and third and fourth thresholds which are obtained from the signal providing the desired white level ($V_b$) decreased respectively with said first (d) and second (c) levels and outputting respective difference signals;

driving means (5) receiving the output signals from the first (3) and second (4) comparison means, a frame return trace end signal (IT2) and a pulsed clock signal (H) having a pulse frequency higher than a frequency of the frame return trace end signal, said driving means providing pulse output signals responsive to said first and second comparison means output signals, said frame return trace return and said pulsed clock signal;

counting means (6) receiving the pulse output signals from said driving means, said counting means including a first counter for selectively counting a first quantity proportional to the first and second levels, respectively, responsive to the difference signals output from said first and second comparison means and responsive to a level of said video signal output from said multiplier lower than said third and fourth thresholds, and including a second counter for selectively decrementing a second quantity proportional to the third and fourth levels, respectively, responsive to the difference signals output from said first and second comparison means and responsive to said level of said video signal output from said multiplier higher than said first and second thresholds; an output signal of the counting means responsive to said first and second counters and supplied to said third input of said multiplier for controlling a gain thereof.

2. An automatic gain control device according to claim 1 wherein the first comparison means (3) comprises a first comparator (30) for comparing the video signal ($V_c$) output by said multiplier with said first threshold representing the desired white level increased by said first level (d) and a second comparator (31) for comparing the video signal ($V_c$) output by said multiplier with said second threshold representing the white level increased by said second level (c), and wherein the second comparison means (4) comprises a first comparator (40) for comparing the video signal ($V_c$) output by said multiplier with the third threshold representing the white level decreased by the second level (c) and a second comparator (41) for comparing the video signal output by said multiplier with said fourth threshold representing the white value decreased by the first level (d).

3. An automatic gain control device according to claim 2 wherein said driving means comprises a first flip-flop (53), having a reset input R receiving an output signal from the first comparator (40) of the second comparison means (4), and a set input S receiving the frame return trace end signal (IT2) the output of said first flip-flop connected to an input of a first AND gate (55), said first AND gate receiving on a second input a signal indicating a beginning of the frame return trace, a second flip-flop (54), having a reset input R receiving an output signal from the second comparator (41) of the second comparison means (4), and a set input S receiving a frame return trace end signal, said second flip-flop having an output Q connected to an input of a second AND gate (56), said second AND gate having a second input receiving the frame return beginning signal, a third AND gate (51) having a first input receiving an output signal from the first comparator (30) of the first comparison means (3), and a fourth AND gate (52) having a first input receiving an output signal from the second comparator (31) of the first comparison means (3), second inputs of said third and fourth AND gates each receiving the clock signal (H).

4. An automatic gain control device according to claim 1, wherein the counting means comprises a first up/down counter (61) and a second up/down counter (62), up and down counting inputs of which are driven by the driving means (5), a first DAC (63) having a weight p, a second DAC (64) having a weight c, respectively receiving counting data output from the first and second up/down counters, outputs of said first and second DACs applied to an adder (65), an output said adder connected to the third input of said multiplier (1) for setting the gain thereof.

5. An automatic gain control device according to claim 4 wherein the output of the first comparator (30) of the first comparison means (3) via the third AND gate (51) drives a down-counting input of the first up/down counter (61), the output of the second comparator (31) of said first comparison means via the fourth AND gate (52) drives a down-counting input of the second up/down counter (62), the output of the first comparator (40) of said second comparison means (4) via said first flip-flop (53) and via said first AND gate (55) drives a counting input of the second up/down counter (62), and wherein the output of the second comparator (41) of the second comparison means via said second flip-flop (54) and said second AND gate (56) drives an up-counting input of the first up/down counter (61).

6. An automatic gain control device according to claim 1 further comprising a filter (2) connected between the output of the multiplier (1) and the input of said first and second comparison means, said filter having a cut-off frequency of approximately 500 KHz.

7. An automatic gain control device for a video signal, comprising:

a variable gain input circuit including a first input for receiving a video signal, a second input for receiving a black video level reference signal, a third input for receiving a gain control signal, and an output for supplying a processed video signal;

first comparison circuit including:
- a first comparator having a first input receiving said processed video signal from said variable gain input circuit, a second input receiving a first threshold signal representing a desired white level increased by a first offset level, and an output, and
- a second comparator having a first input receiving said processed video signal from said variable gain input circuit, a second input receiving a second threshold signal representing said desired white level increased by a second offset level, and an output; second comparison means including:
- a first comparator having a first input receiving said processed video signal from said variable gain input circuit, a second input receiving a third threshold signal representing said desired white level decreased by said first offset level, and an output, and
- a second comparator having a first input receiving said processed video signal from said variable gain input circuit, a second input receiving a fourth threshold signal representing said desired white level decreased by said second offset level, and an output; driving means including:
- a first flip-flop having a reset input receiving said output of said first comparator of said second comparison means and a set input receiving a frame return trace end signal, and an output,
- a first AND gate having a first input receiving said output of said first flip-flop, a second input receiving a frame return beginning signal, and an output,
- a second flip-flop having a reset input receiving said output of said second comparator of said second comparison means and a set input receiving said frame return trace end signal, and an output,
- a second AND gate having a first input receiving said output of said second flip-flop, a second input receiving said frame return beginning signal, and an output,
- a third AND gate having a first input receiving said output of said first comparator of said first comparison means, a second input receiving a clock signal, and an output,
- a fourth AND gate having a first input receiving said output of said second comparator of said first comparison means, a second input receiving said clock signal, and an output; and counting means including:
- a first up/down counter having an up-counting input driven by said output of said second AND gate of said driving means, a down-counting input driven by said output of said third AND gate of said driving means, and an output,
- a first digital-to-analog converter having an input receiving said output of said first up/down counter and an output,
- a second up/down counter having an up-counting input driven by said output of said first AND gate of said driving means, a down-counting input driven by said output of said fourth AND gate of said driving means, and an output,
- a second digital-to-analog converter having an input receiving said output of said second up/down counter and an output,
- an adder circuit having first and second inputs for receiving said outputs of said first and second digital-toanalog converters and having an output connected to said third input of said variable gain input circuit for controlling a gain thereof.

* * * * *